(12) United States Patent
Chengalva (10) Patent No.: US 11,919,250 B2
(45) Date of Patent: Mar. 5, 2024

(54) METHOD OF ASSEMBLY OF CARBON FIBER SPACE FRAMES FOR AEROSPACE STRUCTURES

(71) Applicant: The Boeing Company, Chicago, IL (US)

(72) Inventor: Mahesh Krishna Chengalva, Bothell, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/818,578

(22) Filed: Aug. 9, 2022

(65) Prior Publication Data

US 2023/0061050 A1 Mar. 2, 2023

Related U.S. Application Data

(60) Provisional application No. 63/236,914, filed on Aug. 25, 2021.

(51) Int. Cl.
*B29C 65/50* (2006.01)
*B29K 307/04* (2006.01)
*E04C 3/29* (2006.01)

(52) U.S. Cl.
CPC ...... *B29C 65/5042* (2013.01); *B29C 65/5014* (2013.01); *E04C 3/29* (2013.01); *B29K 2307/04* (2013.01)

(58) Field of Classification Search
CPC ... E04C 3/29; B29C 65/5014; B29C 65/5042; B29C 53/56; B29K 2307/04; F16C 7/026; B64G 99/00; Y10T 403/477
See application file for complete search history.

(56) References Cited

U.S. PATENT DOCUMENTS

| | | | | |
|---|---|---|---|---|
| 926,974 | A * | 7/1909 | Berliner | H05B 7/14 403/267 |
| 2,199,152 | A * | 4/1940 | Edge | E04B 1/168 52/634 |
| 4,652,171 | A * | 3/1987 | Schutze | F16C 7/026 403/267 |
| 5,376,199 | A * | 12/1994 | Humphrey | B29C 53/14 264/328.2 |
| 2003/0180570 | A1 * | 9/2003 | Cercone | E01F 9/696 428/626 |
| 2005/0108980 | A1 * | 5/2005 | Barmakian | E04C 5/166 52/831 |
| 2005/0252153 | A1 * | 11/2005 | Barmakian | E04C 5/065 52/693 |
| 2010/0326003 | A1 * | 12/2010 | Davies | E04C 3/02 52/655.1 |
| 2011/0265303 | A1 * | 11/2011 | Kotlinski | B29C 65/5014 29/700 |

(Continued)

FOREIGN PATENT DOCUMENTS

| | | | | |
|---|---|---|---|---|
| DE | 19723112 C1 * | 6/1999 | | B64G 9/00 |
| WO | WO-2019212334 A1 * | 11/2019 | | E04B 1/1903 |

*Primary Examiner* — Theodore V Adamos
(74) *Attorney, Agent, or Firm* — Quinn IP Law (57) ABSTRACT

A method of assembly of a carbon fiber space frame structure eliminates the need for gusset plates at the joints of the space frame structure. The elimination of the gusset plates at the joints of the space frame structure reduces the weight of the space frame structure and eliminates stresses that occur at the joints due to gusset plates attached at the joints.

20 Claims, 6 Drawing Sheets

(56) References Cited

U.S. PATENT DOCUMENTS

| | | | | |
|---|---|---|---|---|
| 2012/0255255 A1* | 10/2012 | Lin | ............................ | E04C 3/08 |
| | | | | 52/655.1 |
| 2013/0291709 A1* | 11/2013 | Woods | ..................... | B29C 53/58 |
| | | | | 87/9 |
| 2014/0093309 A1* | 4/2014 | Fleischer | ................. | B29C 70/84 |
| | | | | 156/425 |
| 2021/0229757 A1* | 7/2021 | Gralka | ........................ | C08J 5/24 |
| 2022/0408714 A1* | 12/2022 | Frederiksen | ............. | E04C 3/291 |

\* cited by examiner

METHOD OF ASSEMBLY OF CARBON FIBER SPACE FRAMES FOR AEROSPACE STRUCTURES

CROSS-REFERENCE TO RELATED APPLICATIONS

The present application claims the benefit of priority to U.S. Provisional Application No. 63/236,914 filed Aug. 25, 2021, which is hereby incorporated by reference in its entirety.

FIELD

A design and method of assembly of a carbon fiber space frame structure that eliminates the need for gusset plates at the joints of the space frame structure. The elimination of the gusset plates at the joints of the space frame structure reduces the weight of the space frame structure and eliminates stresses that occur at the joints due to gusset plates attached at the joints. Failure at the joints is a common mode of failure in space frame structures and by eliminating this type of failure the strength of the structure is significantly increased.

BACKGROUND

A space frame is basically a truss assembly constructed in three dimensions. Composite space frames are highly efficient structures. A typical space frame is comprised of a plurality of straight rods arranged as a truss in a grid-like pattern or lattice-like pattern. Intersecting ends of adjacent rods in the space frame are joined together.

Gussets plates are often employed in joining the intersecting ends of adjacent rods in a space frame structure. However, gusset plates add weight and gusset joints are often the weak points in any space frame structure.

Metallic gusset plates are typically used to join the intersecting ends of rods of a space frame structure. The metallic gusset plates must be thick enough to withstand the stresses that occur at the joints between intersecting ends of adjacent rods. However, the metal of the metallic gusset plates makes the structure heavy. Additionally, fasteners such as threaded nut and bolt fasteners are used to attach gusset plates to the intersecting ends of adjacent rods. The fasteners must penetrate through the ends of the intersecting rods to join the gusset plates to the ends of the intersecting rods. The fastener holes that penetrate through the ends of the intersecting rods form stress concentration areas where failures can initiate and thus the fastener holes lower the overall strength of the space frame structure.

BRIEF SUMMARY

The design and method of assembly of carbon fiber space frames for aerospace structures of this disclosure employs bent carbon fiber rods to replace the metallic gusset plates at the joints of intersecting rods of the space frame structure. The advantage of employing bent carbon fiber rods at the intersection between adjacent rods in the space frame structure significantly strengthens the joint between the intersecting rods of the space frame structure and reduces the weight of the joint between the intersecting rods of the space frame structure. Also, another advantage of the bent carbon fiber rods as embodied in the space frame structure is the elimination of the need to drill holes in the carbon fiber rods for the attachment of gusset plates. The drilled holes are often a source of failure initiation and lower the overall strength of the space frame structure.

In one exemplary embodiment of the space frame of this disclosure, a joint between adjacent rods of the space frame structure is comprised of a first rod, a second rod, a bent rod, a first tape and a second tape.

The first rod is positioned adjacent the second rod with the first rod and the second rod defining an angle between the first rod and the second rod. The bent rod is positioned adjacent the first rod and the second rod in the angle between the first rod and the second rod.

The first tape is wrapped around the first rod and the bent rod and secures the first rod to the bent rod. The second tape is wrapped around the second rod and the bent rod and secures the second rod to the bent rod. Together, the bent rod, the first tape and the second tape secure the first rod to the second rod at an angle defined between the first rod and second rod.

The space frame is also comprised of a third rod, a second bent rod, a third tape and a fourth tape. The first rod, the second rod and the third rod are positioned in a triangular arrangement. The third rod is positioned adjacent the first rod with the third rod and the first rod defining an angle between the third rod and the first rod. The second bent rod is positioned adjacent the third rod and adjacent the first rod in the angle between the third rod and the first rod.

The third tape is wrapped around the first rod and the second bent rod securing the first rod to the second bent rod. The fourth tape is wrapped around the third rod and the second bent rod securing the third rod to the second bent rod.

A spacer, for example a spacer panel is positioned between the first rod, the second rod and the third rod. The spacer panel is surrounded by the first rod, the second rod and the third rod. A first edge of the spacer panel and a second edge of the space panel are oriented at an angle that matches the angle between the first rod and the second rod. The spacer panel is positioned adjacent the first rod and adjacent the second rod in the angle between the first rod and the second rod. The spacer panel first edge is positioned adjacent the first rod and the second edge is positioned adjacent the second rod.

Additional tape is wrapped around the first rod and over the spacer panel securing the spacer panel to the first rod. Additional tape is wrapped around the second rod and over the spacer panel securing the spacer panel to the second rod. Additional tape is wrapped around the third rod and over the spacer panel securing the spacer panel to the third rod.

The use of the tape in the triangular arrangement of rods in the space frame structure at locations where the rods meet and the use of the tape in securing the spacer panels in the triangles of the space frame structure effectively replaces metallic gusset plates with a far stronger attachment between the rods and the spacer panels of the space frame structure by eliminating stress concentrations produced in a conventional space frame with gusset-type joints at the intersections of individual space frame members. The wrapping of the tape around the spacer panels may be repeated multiple times to further enhance strength, if deemed necessary.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

Corresponding reference numerals will be used throughout the several figures of the drawings.

DETAILED DESCRIPTION

The following detailed description illustrates the claimed invention by way of example and not by way of limitation. This description will clearly enable one skilled in the art to make and use the claimed invention, and describes several embodiments, adaptations, variations, alternatives and uses of the claimed invention, including what I presently believe is the best mode of carrying out the claimed invention. Additionally, it is to be understood that the claimed invention is not limited in its application to the details of construction and the arrangements of components set forth in the following description or illustrated in the drawings. The claimed invention is capable of other embodiments and of being practiced or being carried out in various ways. Also, it is to be understood that the phraseology and terminology used herein is for the purpose of description and should not be regarded as limiting.

Figure 1:
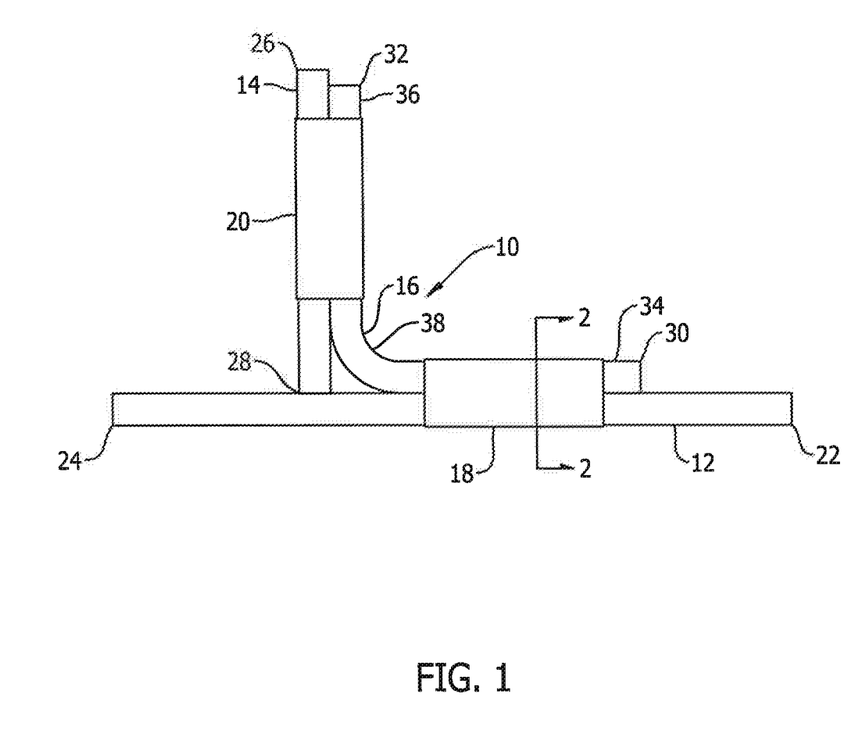
FIG. 1 is a representation of a partial elevation view of a joint formed between a first rod and a second rod according to the method of assembly of this disclosure.

FIG. 1 is a representation of a joint formed between a first rod and a second rod that is one joint of multiple joints employed in constructing a space frame structure according to the method of assembly of this disclosure. The joint 10 of FIG. 1 is comprised of a first rod 12, a second rod 14, a bent rod 16, a first tape 18, and a second tape 20.

The first rod 12 is constructed of a carbon fiber material. The first rod 12 has a cylindrical exterior surface and a straight length with a length dimension between a first end 22 of the first rod 12 and an opposite second end 24 of the first rod 12.

The second rod 14 is constructed of a carbon fiber material. The second rod 14 has a cylindrical exterior surface and a straight length with a length dimension between a first end 26 of the second rod 14 and an opposite second end 28 of the second rod 14.

Although the first rod 12 and the second rod 14 have been described herein as having cylindrical exterior surface configurations and straight length dimensions, it should be understood that the first rod 12 and second rod 14 could have other configurations that will best suit the rods for construction in a particular configuration of a space frame in which the first rod 12 and the second rod 14 are employed. Depending on the configuration of the space frame, the first rod 12 and the second rod 14 could have different cross section configurations such as rectangular or triangular, and different length configurations such as curved, angled and other configurations.

Additionally, although the first rod 12 and the second rod 14 are described as being constructed of a carbon fiber material, other equivalent types of materials could be employed in the construction of the first rod 12 and the second rod 14.

The bent rod 16 is constructed of a carbon fiber material. The bent rod 16 has a cylindrical exterior surface and an angular length between a first end 30 of the bent rod 16 and an opposite second end 32 of the bent rod 16. The bent rod 16 has a first straight portion 34 adjacent the first end 30 of the bent rod 16 and a second straight portion 36 adjacent the second end 32 of the bent rod 16. The bent rod 16 has a bent portion 38 between the first straight portion 34 and the second straight portion 36 of the bent rod 16. The bent portion 38 connects the first straight portion 34 and the second straight portion 36 of the bent rod 16.

The first tape 18 is constructed of a carbon fiber material. The first tape could be constructed of another equivalent type of material. One side of the first tape 18 has an adhesive layer that enables the first tape 18 to bond to the rods and the spacer panels, as will be described. The first tape 18 has a straight length with a length dimension between a first end 40 of the first tape 18 and an opposite second end 42 of the first tape 18. The first tape could have different width dimensions that best suit the first tape to its intended use. The first tape 18 is wrapped around the first rod 12 and is wrapped around the first portion 34 of the bent rod 16. In this matter, the first tape 18 secures the bent rod 16 to the first rod 12.

Figure 2:
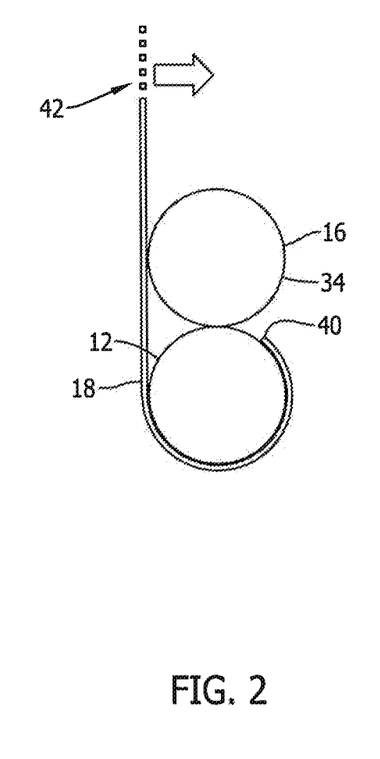
FIG. 2 is a representation of an elevation view of a cross section through the joint of FIG. 1 in the plane of the line 2-2 of FIG. 1.
Figure 3:
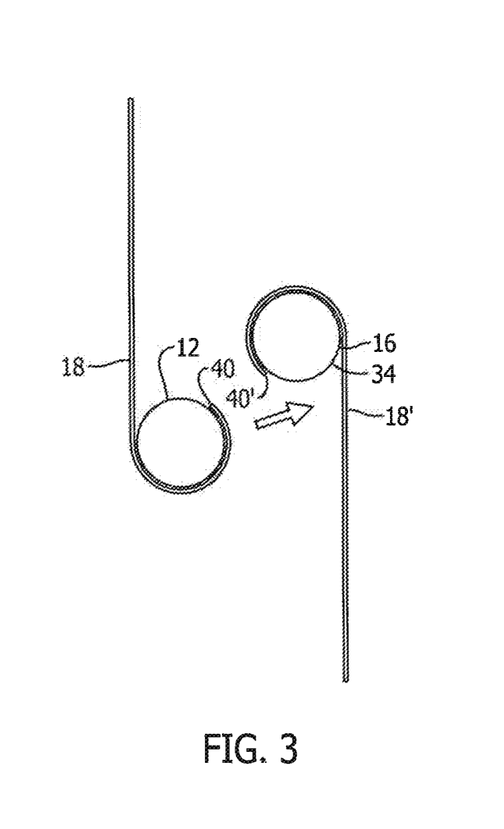
FIGS. 3-7 are representations of elevation views of cross sections through a sequence of steps for constructing the joint of FIG. 1.
Figure 4:
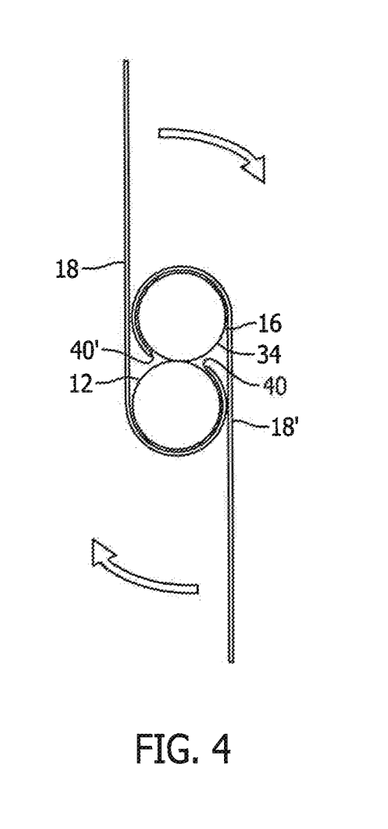
Figure 5:
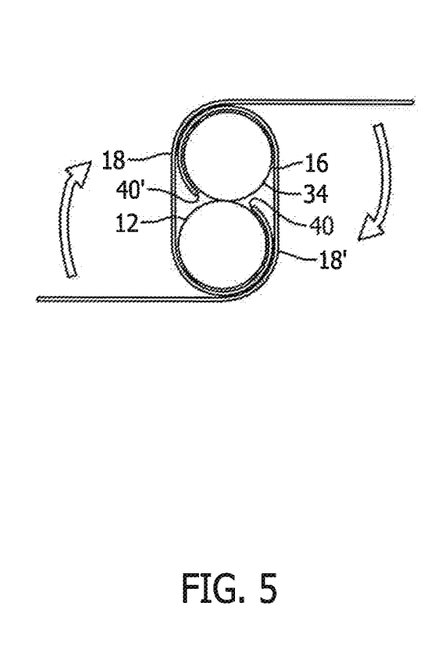
Figure 6:
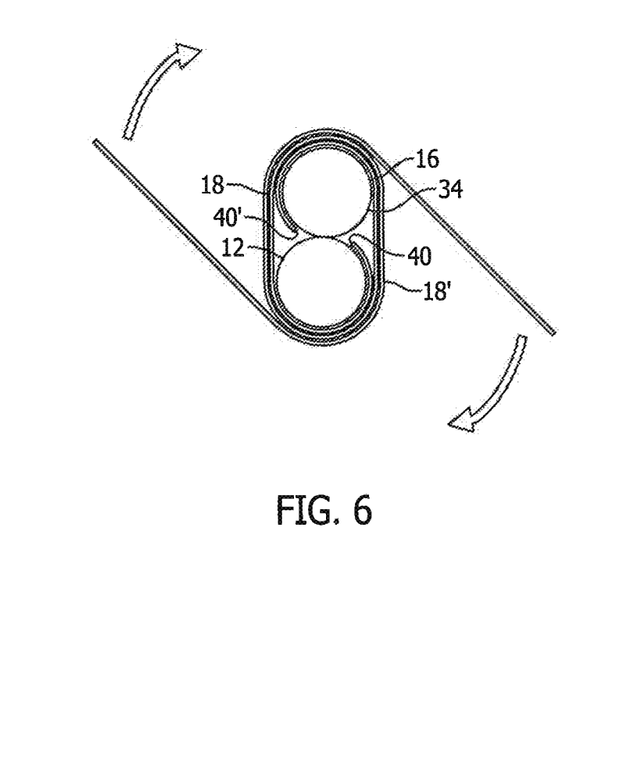
Figure 7:
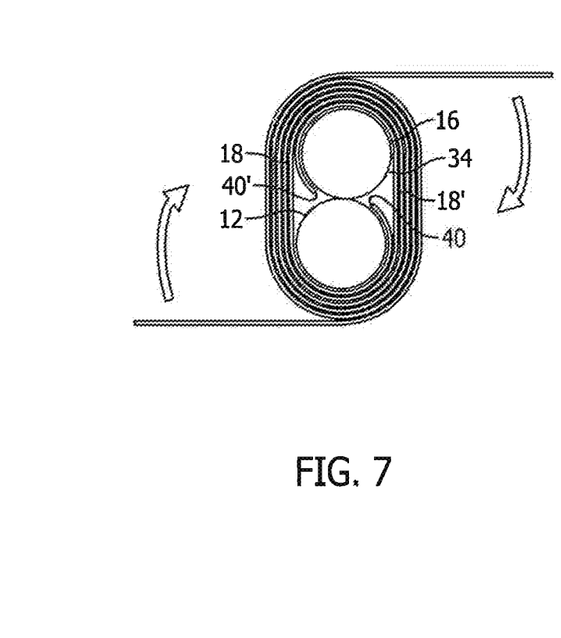

FIG. 2 is a representation of one pattern in which the first tape 18 may be wrapped around the first rod 12 and the first portion 34 of the bent rod 16. As represented in FIG. 2, the first end 40 of the first tape 18 is positioned on the exterior surface of the first rod 12 and is wrapped in a clockwise pattern around the first rod 12. The first tape 18 could be wrapped less than one complete revolution around the first rod 12 as represented in FIG. 2 or could be wrapped in several revolutions around the first rod 12. After the first tape 18 is wrapped around the first rod 12, whether in a fraction of a revolution or in multiple revolutions around the first rod 12, the first tape 18 is then extended to and is wrapped around the first portion 34 of the bent rod 16. Again, the first tape 18 can be wrapped in a fraction of a revolution around the first portion 34 of the bent rod 16 or could be wrapped in multiple revolutions around the first portion 34 of the bent rod 16. In this manner, the first tape 18 secures the first rod 12 to the first portion 34 of the bent rod 16.

FIGS. 3-7 are representations of alternative patterns in which two lengths of the first tape 18, 18' maybe wrapped around the first rod 12 and the first portion 34 of the bent rod 16 in securing the first rod 12 to the bent rod 16. As represented in FIGS. 3-7, the first end 40 of a first tape 18 is positioned on the exterior surface of the first rod 12 and is wrapped in a clockwise pattern around the first rod 12 with the adhesive of the first tape 18 bonding the first tape 18 to the first rod 12. Additionally, the first end 40' of an additional first tape 18' is positioned on the exterior surface of the first portion 34 of the bent rod 16 and is wrapped in a clockwise pattern around the first portion 34 of the bent rod 16 with the adhesive of the additional first tape 18' bonding the additional tape 18' to the first portion 34 of the bent rod 16. As represented in FIGS. 3-7, both the first tape 18 and the additional tape 18' are simultaneously wrapped around the first rod 12 and the first portion 34 of the bent rod 16 and around each other in constructing a strong bond between the first rod 12 and the first portion 34 of the bent rod 16.

The second tape 20 is also constructed of a carbon fiber material. The second tape 20 could be constructed of another equivalent material. The second tape 20 has a straight length with a length dimension between a first end of the second tape and an opposite second end of the second tape. The second tape 20 is wrapped around the second rod 14 and is wrapped around the second straight portion 36 of the bent rod 16. In this manner, the second tape 20 secures the second rod 14 to the bent rod 16. The second tape 20 could be wrapped around the second rod 14 and the bent rod 16 in the same manner that the first tape 18 is wrapped around the first rod 12 and the bent rod 16 described earlier. Additionally, the second tape 20 and an additional second tape 20' maybe wrapped around the second rod 14 and the second portion 36 of the bent rods 16 in the same manner as the first tape 18 and the additional first tape 18' described earlier.

As represented in FIG. 1, the first rod 12 is positioned relative to the second rod 14 with the first rod 12 and the second rod 14 defining an angle between the first rod 12 and the second rod 14. The bent rod 16 is positioned adjacent the first rod 12 and adjacent the second rod 14 with the first straight portion 34 of the bent rod 16 positioned adjacent the first rod 12 and with the second straight portion 36 of the bent rod 16 positioned adjacent the second rod 14. The first tape 18 (or the first tape 18 and the additional first tape 18') and the second tape 20 (or the second tape 20 and the additional second tape 20') secure the bent rod 16 to the first rod 12 and the second rod 14 in the relative positions of the bent rod 16, the first rod 12 and the second rod 14 represented in FIG. 1.

Figure 8:
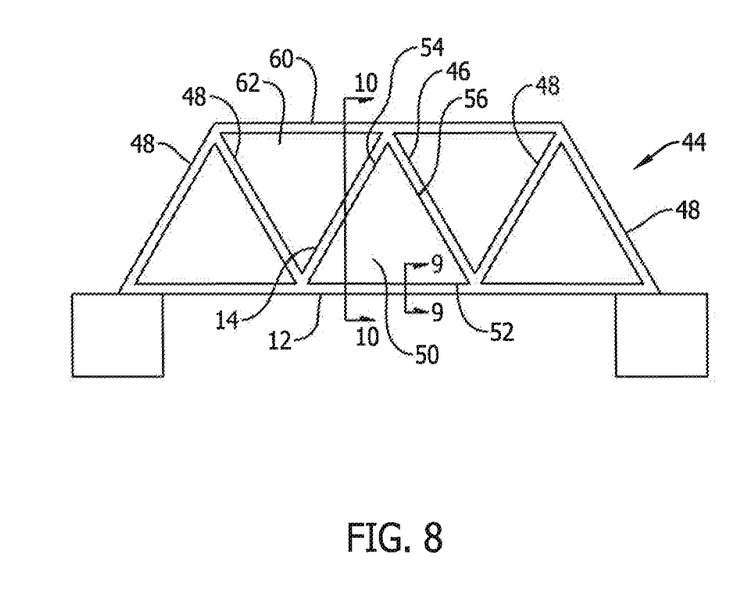
FIG. 8 is a representation of an elevation view of a space frame structure formed by multiple joints such as that represented in FIG. 1.

Represented in FIG. 8 is a truss or space frame structure 44 constructed of several joints such as the joint represented in FIG. 1. The joint of FIG. 1 is represented in the space frame structure 44 of FIG. 8 with the first rod 12 and the second rod 14 positioned at an angular orientation of 60 degrees, rather than the 90 degree angular orientation between the first rod 12 and the second rod 14 represented in FIG. 1. Also represented in FIG. 8 is a third rod 46. The third rod 46 is also constructed of a carbon fiber material. The third rod 46 has a cylindrical exterior surface with a straight length and a length dimension between a first end of the third rod and an opposite second end of the third rod. The third rod 46 has basically the same construction and properties as the first 12 and second 14 rods.

FIG. 8 is a representation of a side elevation view of the truss or a space frame structure 44 in which the first rod 12 and second rod 14 are employed in constructing a portion of the structure 44. A bent rod 16 is also employed in securing the first rod 12 to the second rod 14 in the structure 44 of FIG. 8, although the bent rod 16, the first tape 18 and the second tape 20 are not represented in FIG. 8. In addition to the first rod 12 and the second rod 14, the third rod 46 is employed in constructing a triangular portion of the space frame structure 44. Like the first rod 12 and the second rod 14, the third rod 46 of FIG. 8 is also constructed of a carbon fiber material. The third rod 46 has a cylindrical exterior surface with a straight length and a length dimension between a first end of the third rod 46 and an opposite second end of the third rod 46. Basically, the third rod 46 has the same construction and the same properties as the first rod 12 and the second rod 14. Although not shown in FIG. 8, a bent rod and tapes are employed in securing the third rod 46 to the first rod 12 and an additional bent rod, and additional tapes are employed in securing the third rod 46 to the second rod 14. As represented in FIG. 8, the first rod 12, the second rod 14 and the third rod 46 are all secured together by tapes in the triangular configuration represented. Also as represented in FIG. 8, additional rods 48 having the same basic constructions and properties of the first rod 12, the second rod 14 and the third rod 46 are employed in constructing the space frame structure 44. Although not shown or represented in FIG. 8, the additional rods 48 are all secured together in the construction of the space frame structure 44 employing tapes and bent rods as described above with regard to the first rod 12, the second rod 14 and the bent rod 16.

Also represented in FIG. 8 is a spacer. The spacer is a spacer panel 50 that is positioned between the first rod 12, the second rod 14 and the third rod 46. Unlike the rods 12, 14, 16, 46 and the tapes 18, 18', 20, 20', the spacer panel 50 can be constructed of a wide variety of materials that are lightweight materials. Possible spacer panel 50 materials include thermoplastics, high density polyethylene, rigid foam board and other equivalent types of materials. The spacer panel 50 has two primary purposes. To provide a surface for the tapes to be adhesively bonded to and to prevent buckling of the rods under compression loads. As represented in FIG. 8, the spacer panel 50 has a triangular configuration that is dimensioned to fit within and be surrounded by the first rod 12, the second rod 14 and the third rod 46. The spacer panel 50 has a first edge 52 and a second edge 54 that are oriented at an angle that matches the angle between the first rod 12 and the second rod 14. The spacer panel also has a third edge 56. The second edge 54 and the third edge 56 of the spacer panel 50 match the angle between the second rod 14 and the third rod 46. The third edge 46 and the first edge 52 of the spacer panel 50 are oriented at an angle that matches the angle between the third rod 46 and the first rod 12.

Figure 9:
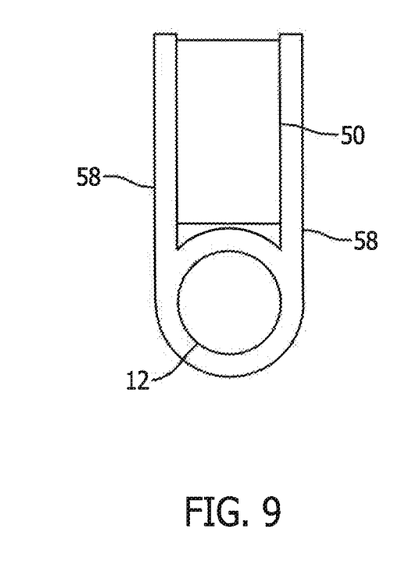
FIG. 9 is a representation of a partial cross section elevation view through the space frame structure of FIG. 8 in the plane of line 9-9 of FIG. 8.

Additional tapes 58 are employed in securing the first rod 12, the second rod 14 and the third rod 46 to the spacer panel 50. The tapes 58 are carbon fiber tapes. The tapes 58 are wrapped around the first rod 12 and over the spacer panel 50 securing the spacer panel 50 to the first rod 12. FIG. 9 is a representation of a partial elevation cross section view through the first rod 12 and the spacer panel 50 in a plane of line 9-9 of FIG. 8 showing the first rod 12, the spacer panel 50 and the additional tapes 58. The additional tapes 58 are also wrapped around the second rod 14 and over the spacer panel 50 securing the spacer panel 50 to the second rod 14. The additional tapes 58 are wrapped around the third rod 46 and over the spacer panel 50 securing the spacer panel 50 to the third rod 46. The additional tapes 58 wrapped around the first rod 12, the second rod 14 and the third rod 46 can be positioned side by side on the rods before being extended over the spacer panel 50. Additionally, the additional tapes 58 can be wrapped around the rods 12, 14, 46 and then extended over both sides of the spacer panel 50. This results in the spacer panel 50 being completely covered by additional lengths of tapes 58 that secure the spacer panel 50 to the first rod 12, the second rod 14 and the third rod 46.

Figure 10:
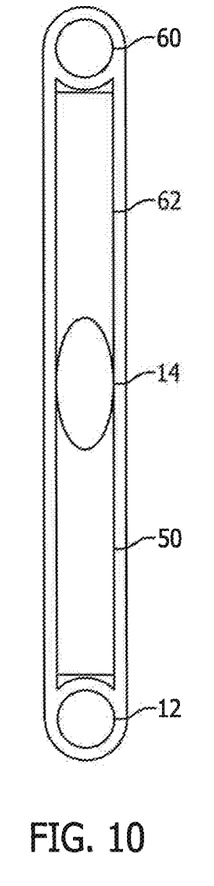
FIG. 10 is a representation of a cross section elevation view through the space frame structure of FIG. 8 in a plane of the line 10-10 of FIG. 8.

FIG. 10 is a representation of a cross section view through the first rod 12 and the second rod 14 and a portion of the spacer panel 50, as well as through portions of an additional rod 60 and an additional spacer panel 62. The additional spacer panels represented within the triangular configurations of the additional rods of FIG. 8 are secured to their surrounding rods by additional tapes in the same manner discussed above.

Figure 11:
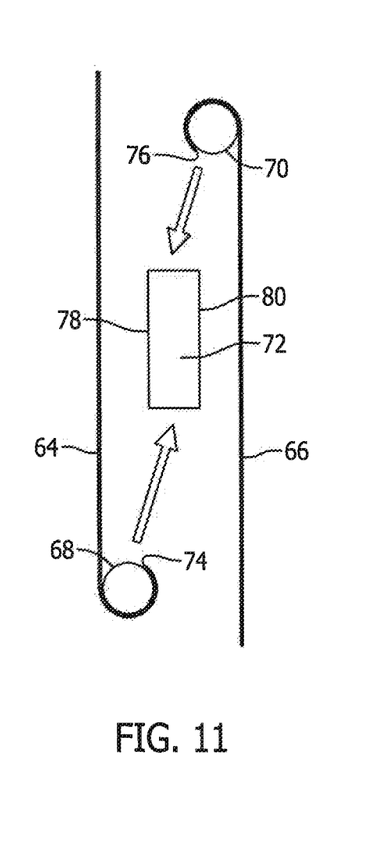
FIGS. 11-13 are representations of elevation views of cross sections through a sequence of steps for constructing the space frame of FIG. 8.
Figure 12:
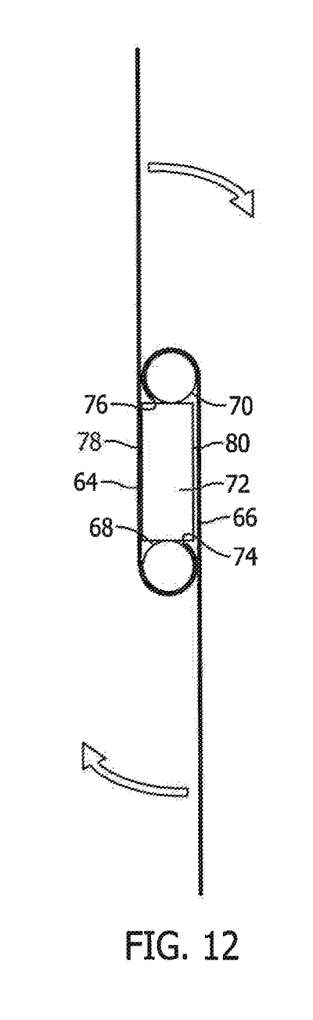
Figure 13:
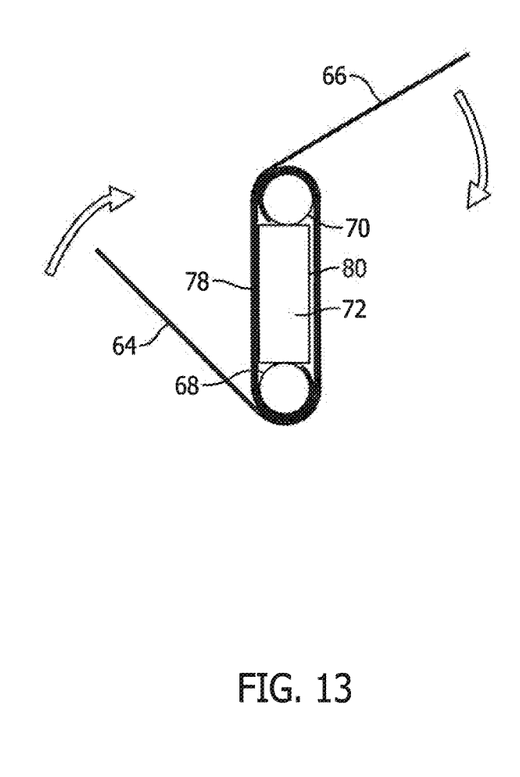

FIGS. 11-13 are representations of an example of a sequence of steps of wrapping tapes 64, 66 around rods 68, 70 and a spacer panel 72 in securing the rods 68, 70 to the opposite sides of the spacer panel 72. First ends 74, 76 of the respective tapes 64, 66 are first secured to the respective rods 68, 70 by the adhesives of the tapes. The tapes 64, 66 are than partially wrapped around the respective rods 68, 70 and then extended over the opposite side surface is 78, 80 of the spacer panel 72. The tapes 64, 66 are then continued to be wrapped in a clockwise pattern around the rods 68, 70 and the opposite side surface is 78, 80 of the spacer panel 72 in securing the rods 68, 70 to the spacer panel 72.

The high strength of the carbon fiber tapes employed in securing the carbon fiber rods together and in securing the carbon fiber rods to the spacer panels surrounded by the rods replaces metallic gusset plates with a far stronger attachment and avoids stress concentrations occurring in the areas of the joints between the adjacent rods of the spacer frame structure.

As various modifications could be made in the construction of the space frame structure and it's method of construction herein described and illustrated without departing from the scope of the invention, it is intended that all matter contained in the foregoing description or shown in the accompanying drawings be interpreted as illustrative rather than limiting. Thus, the breadth and scope of the present disclosure should not be limited by any of the above described exemplary embodiments, but should be defined only in accordance with the following claims appended hereto and their equivalents.

In view of the above, it will be seen that the several objects and advantages of the present invention have been achieved and other advantageous results have been obtained.

As various changes could be made in the above constructions without departing from the scope of the invention, it is intended that all matter contained in the above description or shown in the accompanying drawings shall be interpreted as illustrative and not in a limiting sense.

The invention claimed is:

1. A space frame comprising:
   a first rod;
   a second rod;
   a bent rod having a first end of the ent rod, a second end of the bent rod, a first straight portion adjacent the first end of the bent rod, a second straight portion adjacent the second end of the bent rod, and a bent portion between and connected to the first and second straight portions;
   a first tape wrapped around the first rod and first straight portion of the bent rod securing the bent rod to the first rod, wherein the first rod and the first straight portion of the bent rod are oriented generally parallel with each other; and
   a second tape wrapped around the second rod and the second straight portion of the bent rod securing the bent rod, wherein the second rod and the second straight portion of the bent rod and oriented generally parallel with each other.

2. The space frame of claim 1, further comprising:
   the first rod is positioned adjacent the second rod with the first rod and the second rod defining an angle between the first rod and the second rod; and,
   the bent rod is positioned adjacent the first rod, is positioned adjacent the second rod and is positioned in the angle between the first rod and the second rod.

3. The space frame of claim 2, further comprising:
   a third rod;
   a second bent rod;
   a third tape wrapped around the first rod and the second bent rod securing the second bent rod to the first rod; and,
   a fourth tape wrapped around the third rod and the second bent rod securing the second bent rod to the third rod.

4. The space frame of claim 3, further comprising:
   the third rod is positioned adjacent the first rod with the third rod and the first rod defining an angle between the third rod and the first rod; and,
   the second bent rod is positioned adjacent the third rod and is positioned adjacent the first rod and is positioned in the angle between the third rod and the first rod.

5. The space frame of claim 4, further comprising:
   a spacer panel, the spacer panel is positioned between the first rod, the second rod and the third rod and is surrounded by the first rod, the second rod and the third rod.

6. The space frame of claim 1, further comprising:
   a spacer panel;
   the first tape is wrapped around the first rod and over the spacer panel securing the spacer panel to the first rod; and,
   the second tape is wrapped around the second rod and over the spacer panel securing the spacer panel to the second rod.

7. The space frame of claim 6, further comprising:
   the spacer panel is positioned adjacent the first rod and adjacent the second rod and is positioned in an angle between the first rod and the second rod.

8. The space frame of claim 7, further comprising:
   the spacer panel has a first straight edge positioned adjacent the first rod; and,
   the spacer panel has a second straight edge positioned adjacent the second rod.

9. The space frame of claim 8, further comprising:
   the first straight edge of the spacer panel and the second straight edge of the spacer panel are positioned at an angle that matches the angle between the first rod and the second rod.

10. A space frame comprising:
    a first rod, the first rod has a cylindrical exterior surface and a straight length with a length dimension between a first end of the first rod and an opposite second end of the first rod;
    a second rod, the second rod has a cylindrical exterior surface and a straight length with a length dimension between a first end of the second rod and an opposite second end of the second rod;
    a bent rod, the bent rod has a cylindrical exterior surface and an angular length between a first end of the bent rod and a second end of the bent rod, the bent rod has a first straight portion adjacent the first end of the bent rod, the bent rod has a second straight portion adjacent the second end of the bent rod, the bent rod has a bent portion between the first straight portion and the second straight portion, the bent portion is connected to the first straight portion and the second straight portion;
    a first tape, the first tape has a straight length with a length dimension between a first end of the first tape and an opposite second end of the first tape, the first tape is wrapped around the first rod and is wrapped around the first straight portion of the bent rod and secures the first rod to the bent rod, wherein the first rod and the first straight portion of the bent rod are oriented generally parallel with each other; and
    a second tape, the second tape has a straight length with a length dimension between a first end of the second tape and an opposite second end of the second tape, the second tape is wrapped around the second rod and is wrapped around the second straight portion of the bent rod and secures the second rod to the bent rod, wherein the second rod and the second straight portion of the bent rod are oriented generally parallel with each other.

11. The space frame of claim 10, further comprising:
the first end of the first rod is positioned adjacent the first end of the second rod with the first rod and the second rod defining an angle between the first rod in the second rod; and,
the bent rod is positioned adjacent the first rod and the second rod with the first straight portion of the bent rod being positioned adjacent the first end of the first rod and the second straight portion of the bent rod being positioned adjacent the first end of the second rod.

12. The space frame of claim 11, further comprising:
a third rod, the third rod has a cylindrical exterior surface with a straight length with a length dimension between a first end of the third rod and an opposite second end of the third rod;
a second bent rod, the second bent rod has a cylindrical exterior surface and an angular length between a first end of the second bent rod and a second end of the second bent rod, the second bent rod having a first straight portion of the second bent rod adjacent the first end of the second bent rod, the second bent rod having a second straight portion of the second bent rod adjacent the second end of the second bent rod, the second bent rod having a bent portion of the second bent rod between the first straight portion of the second bent rod and the second straight portion of the second bent rod, the bent portion of the second bent rod is connected between the first straight portion of the second bent rod and the second straight portion of the second bent rod;
a third tape, the third tape has a straight length with a length dimension between a first end of the third tape and an opposite second end of the third tape, the third tape is wrapped around the first rod adjacent the second end of the first rod and the third tape is wrapped around the first straight portion of the second bent rod with the third tape securing the first rod to the second bent rod; and,
a fourth tape, the fourth tape has a straight length with a length dimension between a first end of the fourth tape and an opposite second end of the fourth tape, the fourth tape is wrapped around the third rod adjacent the first end of the third rod and the fourth tape is wrapped around the second straight portion of the second bent rod with the third tape securing the third rod to the second bent rod.

13. The space frame of claim 12, further comprising:
the first end of the third rod is positioned adjacent the second end of the first rod with the third rod and the first rod defining an angle between the third rod and the first rod; and,
the first straight portion of the second bent rod is positioned adjacent the second end of the first rod and the second straight portion of the second bent rod is positioned adjacent the first end of the third rod and the second bent rod is positioned in the angle between the first rod and the third rod.

14. The space frame of claim 13, further comprising:
a spacer panel, the spacer panel is positioned between the first rod, the second rod and the third rod and is surrounded by the first rod, the second rod and the third rod.

15. The space frame of claim 10, further comprising:
a spacer panel;
the first tape is wrapped around the first rod and over the spacer panel securing the spacer panel to the first rod; and,
the second tape is wrapped around the second rod and over the spacer panel securing the spacer panel to the second rod.

16. The space frame of claim 15, further comprising:
the spacer panel is positioned adjacent the first rod and adjacent the second rod and is positioned in an angle between the first rod and the second rod.

17. The space frame of claim 16, further comprising:
the spacer panel has a first straight edge positioned adjacent the first rod; and,
the spacer panel has a second straight edge positioned adjacent the second rod.

18. The space frame of claim 17, further comprising:
the first straight edge of the spacer panel and the second straight edge of the spacer panel are positioned at an angle that matches the angle between the first rod and the second rod.

19. A method of constructing a space frame comprising:
wrapping a first tape around a first rod and around a first portion of a bent rod securing the first rod to the first straight portion of the bent rod, wherein the first rod and the first straight portion of the bent rod are oriented generally parallel with each other; and,
wrapping a second tape around a second rod and around a second straight portion of the bent rod securing the second rod to the second straight portion of the bent rod, wherein the second rod and the second straight portion of the bent rod are oriented generally parallel with each other, with the first rod positioned adjacent the second rod and with the first rod and the second rod defining an angle between the first rod and the second rod.

20. The method of claim 19, further comprising:
positioning a spacer panel between the first rod and the second rod;
wrapping the first tape around the first rod and over the spacer panel securing the spacer panel to the first rod; and,
wrapping the second tape around the second rod and over the spacer panel securing the spacer panel to the second rod.

* * * * *

UNITED STATES PATENT AND TRADEMARK OFFICE
CERTIFICATE OF CORRECTION

PATENT NO. : 11,919,250 B2
APPLICATION NO. : 17/818578
DATED : March 5, 2024
INVENTOR(S) : Mahesh Krishna Chengalva It is certified that error appears in the above-identified patent and that said Letters Patent is hereby corrected as shown below:

In the Claims

Claim 1, Column 7, Line 37: "a first end of the ent rod" should read --a first end of the bent rod--
Claim 1, Column 7, Line 43: "the first rod and first straight" should read --the first rod and the first straight--
Claim 1, Column 7, Lines 49-50: "the bent rod, wherein" should read --the bent rod to the second rod, wherein--
Claim 1, Column 7, Line 51: "the bent rod and oriented" should read --the bent rod are oriented--

Signed and Sealed this
Fourteenth Day of January, 2025

Derrick Brent
*Acting Director of the United States Patent and Trademark Office*